(12) United States Patent
Ikezawa et al.

(10) Patent No.: US 6,538,051 B1
(45) Date of Patent: Mar. 25, 2003

(54) AQUEOUS COATING AGENT OF HYDROPHILIC RESIN, MOS₂ AND SB₂S₃ AND/OR SB₂S₅

(75) Inventors: Atsushi Ikezawa, Kanagawa (JP); Tetsuji Yamaguchi, Kanagawa (JP)

(73) Assignee: Dow Corning Asia, Ltd., Tokyo (JP)

( * ) Notice: Subject to any disclaimer, the term of this patent is extended or adjusted under 35 U.S.C. 154(b) by 0 days.

(21) Appl. No.: 08/826,305

(22) Filed: Mar. 27, 1997

(51) Int. Cl.⁷ .............. C08K 3/20; C08K 3/10; C08L 63/00; C08L 63/10
(52) U.S. Cl. .............. 523/402; 524/560; 524/588; 524/601
(58) Field of Search .............. 523/402; 524/560, 524/588, 601

(56) References Cited

U.S. PATENT DOCUMENTS

| | | | | |
|---|---|---|---|---|
| 3,736,276 A | * | 5/1973 | Crowne et al. | 523/424 |
| 3,873,458 A | * | 3/1975 | Parkinson | 428/341 |
| 3,975,322 A | * | 8/1976 | Reinshagen et al. | 523/466 |
| 4,303,537 A | * | 12/1981 | Laepple et al. | 252/30 |
| 5,432,211 A | * | 7/1995 | Morita et al. | 523/466 |

FOREIGN PATENT DOCUMENTS

| | | | |
|---|---|---|---|
| EP | 687715 | * | 12/1995 |
| JP | 06-200275 | | 7/1994 |
| JP | 07-11088 | | 1/1995 |
| JP | 7-34030 | * | 2/1995 |

OTHER PUBLICATIONS

CAPLUS accession No. 1978:565804, Nosov, Khim. Tekhnol. Topl. Masel (7), pp. 43–44, 1978.*
CAPLUS accession No. 1976:75779, Vlasyuk et al., Ukr. Khim. Zh. (Russ. Ed.), vol. 41, No. 12, pp. 1319–1320, 1975.*
CAPLUS accession No. 1988:224001, Centers, Tribol. Trans., vol. 31, No. 2, pp. 149–156, 1988.*
Vlasyuk et al.; Electrodeposition of Protective and Antifriction Polymeric Coatings from Aqueous Media; Ukrainskii Khimicheskii Zhurnal, vol. 41, No. 12, pp. 1319–1320, 1975.
Nosov; Chemmotology of Fuels and Lubricants; Lubricating Properties of Mixture of Molybedenum Disulfide with Oxides and Sulfides of Antimony; (CAPLUS accession No. 1978:565804).

* cited by examiner

Primary Examiner—Robert E. L. Sellers
(74) Attorney, Agent, or Firm—Paula J. Lagattuta; Larry A. Milco

(57) ABSTRACT

An aqueous coating agent for forming lubricating films comprising a hydrophilic resin; a solid lubricating agent comprising $MoS_2$ and at least one antimony sulfide selected from the group consisting of $Sb_2S_3$ and $Sb_2S_5$, where a weight ratio of $MoS_2$ to antimony sulfides is from 1;0.05 to 1:12; and water and wherein the weight ratio of the solid lubricating agent to the hydrophilic resin is from 0.7:1 to 3:1.

13 Claims, No Drawings

AQUEOUS COATING AGENT OF HYDROPHILIC RESIN, MOS₂ AND SB₂S₃ AND/OR SB₂S₅

BACKGROUND OF THE INVENTION

1. Field of the Invention

The present invention relates to an aqueous coating agent for forming lubricating films, in particular, to an aqueous coating agent for forming lubricating films suitable for prolonged use on sliding members of torque-transmitting parts utilized in automobile drive and prime mover systems.

2. Description of the Related Art

Conventional aqueous coating agents for forming lubricating films, in particular those for use with sliding parts, comprise substances which possess excellent oil-proof and heat-resistant properties and are formed by dispersing molybdenum disulfide, graphite powder or carbon fibers in binders such as a polyimide resin, an epoxy resin, or a phenol resin.

Although aforementioned coating agents for forming lubricating films in an aqueous-system form are known as well, in the majority of cases such coating agents are based on organic solvents. For example, in their earlier patent application (Japanese Laid-Open Patent Application Kokai 6-200275) the authors of the present patent application utilize an organic solvent.

Recently, however, more strict requirements were imposed concerning environment protection and reducing the impact on human health. For this reason, many industries had to quickly switch from organic solvent systems to aqueous systems.

For the same reason, there is a strong demand for aqueous systems exists also in the field of coating agents for forming lubricating films. An example of such a water-based coating agent for forming lubricating films is disclosed in Japanese Laid-Open Patent Application Kokai 7-11088 wherein silica is used as an agent for imparting lubricating properties. However, this aqueous coating agent for forming lubricating films appears to be unsuitable for prolonged use on sliding members of torque-transmitting parts utilized in automobile drive and prime mover systems.

The present invention is aimed at elimination of the problems of the prior art, and it is an object of the present invention to provide an aqueous coating agent for forming lubricating films with improved lubricating properties, long-service life, in particular, on sliding members of torque-transmitting parts utilized in automobile drive and prime mover systems, and excellent load-bearing properties.

SUMMARY OF THE INVENTION

The present invention is characterized by the fact that, in an aqueous coating agent for forming lubricating films, a number of specific solid lubricating agents is used in a specific weight ratio range, and that the aforementioned solid lubricating agents is used in a specific weight ratio with regard to a hydrophilic resin.

In other words, the problems inherent in the prior art are solved by utilizing an aqueous coating agent for forming lubricating films that comprises the following first component, second component, and third component: the first component: a hydrophilic resin; the second component: a solid lubricating agent comprising $MoS_2$ and at least one antimony sulfide selected from the group consisting of $Sb_2S_3$ and $Sb_2S_5$, where the weight ratio of $MoS_2$ to antimony sulfide is from 1:0.05 to 1:1.2; and the third component is water. The weight ratio of the second component to the first component is from 0.7 to 3.

DETAILED DESCRIPTION OF THE INVENTION

The invention will be further described with reference to practical embodiments.

Although there are no special imitations with regard to the hydrophilic resin which is the aforementioned first component, it is recommended that it be a hydrophilic organic resin. What is meant here under by term "hydrophilic properties" is that the aforementioned organic resin is either soluble in water, or is at least stable in it in a dispersed form. An organic resin with aforementioned hydrophilic properties is a resin which normally has in its molecule a hydrophilic polar group. The following are examples of hydrophilic polar groups:

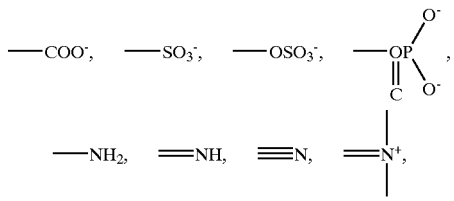

Furthermore, it is possible to utilize organic resins which do not possess the aforementioned hydrophilic properties, such as epoxy resins, alkyd resins, acrylic resins, and silicone resins, provided their hydrophilic properties have been improved. Such an improvement can be achieved, e.g., by: (1) imparting hydrophilic properties as a result of graft polymerization or copolymerization of a monomer having a hydrophilic group capable of imparting hydrophilic properties to an organic resin which has no hydrophilic properties; or (2) introducing the hydrophilic group itself to an organic resin without hydrophilic properties as a result of amination, hydroxylation, carboxylation, or esterification. Especially preferable is an epoxy ester obtained by esterifying a hydroxyl group of an epoxy resin with linseed oil, dehydrated castor oil, soybean oil, and coconut oil, and the like.

It is recommended that the solid lubricating agent which is the aforementioned second component be represented by $MoS_2$ and at least one antimony sulfide selected from the group consisting of $Sb_2S_3$ and $Sb_2S_5$, where the weight ratio of $MoS_2$ to antimony sulfide is from 1:0.05 to 1.:1.2. If the solid lubricating agent component does not contain both the aforementioned antimony sulfide and $MoS_2$, it would be impossible to obtain an aqueous coating agent for the formation of lubricating coating films with load-carrying capacity, which is an object of the present invention. The solid lubricating agent of the second component may comprise more than one of the aforementioned antimony sulfide. Furthermore, even though the aforementioned component contains both the antimony sulfide and $MoS_2$ but their weight ratio is beyond the range of 1:0.05 to 1:1.2, it would be still impossible to obtain an aqueous coating agent for the formation of lubricating coating films with properties specified by the present invention. For example, if $MoS_2$ is used in an excessive amount, the period of time during which the coating film preserves its lubricating properties (i.e., the service life) will be shortened, and if the antimony sulfide is used in an excessive amount, the coating film will have insufficient load-bearing capacity, and will acquire an increased coefficient of friction. This, in turn, will lead to heating during the use, and finally to thermal decomposition of the coating film and to a decrease in its service life. For the above reasons, it is recommended that a weight ratio of $MoS_2$ to antimony sulfide be from .1:0.2 to 1:0.5.

$MoS_2$ and antimony sulfide are indispensable components, but other solid lubricating agents also may be added provided their types and quantities are not detrimental to the object of the invention. An example of such a solid lubricating agent is $Sb_2O_3$ which is used in a weight ratio to the antimony sulfide which is from 1:0.5 to 1:5.0, preferably within the range of 1:0.5 to 1:1.5. The presence of this additive further improves lubricating properties. The use of aforementioned $Sb_2O_3$ in an excessive weight ratio beyond the specified range, on contrary, will decrease the service life of the lubricant.

A weight ratio of the second component to the first component, i.e., the weight of the solid lubricating agent to the weight of the hydrophilic resin (hereinafter referred to as a "PB ratio") should be from 0.7 to 3.1. The most preferable PB ratio is within the range of 0.9 to 2.5:1

If the PB ratio is beyond the range of 0.7 to 3, e.g., if the solid lubricating agent is used in an excessive amount so that the aforementioned PB ratio exceeds 3, the strength of the coating film will be reduced and the service life of the lubricant will be shortened. Moreover, this will reduce anticorrosive properties to the level unsuitable for practical use. If, on the other hand, the hydrophilic resin is used in an excessive amount so that the PB ratio becomes lower than 0.7, it would be impossible to obtain a lubricating coating film with lubricating properties suitable for practical application.

There are no special limitations with regard to the amount of water, which is the aforementioned third component, provided it is used within the range that ensures obtaining of the aqueous coating agent for the formation of lubricating films with characteristics that satisfy the object of the invention.

Furthermore, in order to improve compatibility between water and the aforementioned hydrophilic resin, an agent that improves compatibility of the hydrophilic resin for water can be added to the aqueous coating agent of the present invention for forming lubricating films. The use of such an agent provides more efficient dissolving of the hydrophilic resin in water and stabilizes dispersion of this resin in water. Moreover, the use of such an agent broadens the assortment of types of hydrophilic resins suitable for the purposes of the present invention. As a result, e.g., less expensive hydrophilic resins can be selected. The aforementioned compatibility agent may be represented by water-soluble amines, NaOH, or the like. A preferable one is ethanolamine. Nevertheless, there are no special limitations with regard to the type of the compatibility agent, provided it ensures compatibility of the hydrophilic resin used for the purposes of the present invention with water.

The aqueous coating agent of the present invention may be combined with other additives such as dyes, anti-corrosive agents, heat-resistance improvers, and the like. Furthermore, the aqueous coating agent of the present invention may be combined small amounts of graphite, tungsten disulfide, boron nitride, mica, or other solid lubricants, provided they are not detrimental to the effect of the invention.

The aqueous coating agent of the invention for forming lubricating films may be prepared by different methods. One example of these methods is given below.

(1) Water (total quantity), a hydrophilic resin (30% of the entire charge), and a compatibility agent (total quantity) are mixed and stirred, until the hydrophilic resin is dissolved in water.

(2) One third (⅓) of the total amount of solid lubricating agents and other additives are loaded and treated for 30 minutes in a mill. This operation is repeated three times until the entire quantity of the aforementioned components is loaded.

(3) The remainder of the entire amount of the hydrophilic resin is loaded, and the mixture is treated in a mill for 10 minutes.

EXAMPLES

The invention will be further described in detail with reference to practical and comparative examples. In the following practical and comparative examples, the FALEX Pin And Vee Block Test Machine was used "Falex" is a registered trademark of Bellwood. The outer surfaces of the pin and V-block of this machine were subjected to sand blasting, and after treating with a phosphoric acid $Mn_3(PO_4)_2$, the contact surface of the pin was coated by spraying with an appropriate coating agent. The coating was dried and cured by heating. The so-called Falex Endurance Life was then measured as a time till tearing or scoring on the surface of the solidified coating under the following contact conditions: linear contact; frequency of rotation 290 rpm; sliding speed 0.096 m/sec; and compressive force 1000 Lbs.

The coating film used in the aforementioned experiment was obtained by drying an 8 to 13 μm thick coating film, formed by applying an appropriate coating agent, for 30 minutes at 25° C. with subsequent curing for 1 hour at 200° C.

Practical Example 1

In Practical Examples 1-1 to 1-6, the Falex Endurance Life was determined for aqueous coating agents suitable for forming lubricating films. Tests were carried out with the use of the aforementioned FALEX testers and the test procedure. The results are shown in Tables 1, 2, and 3.

Practical Examples 1-1, 1-3, 1-4, 1-5, and 1-6 show the effect exerted on the FALEX Endurance Life by the addition of at least one type of antimony sulfide selected from the group consisting of $Sb_2S_3$ and $Sb_2S_5$. Practical Example 1-2 shows an effect produced by adding $Sb_2O_3$ to the aforementioned antimony sulfides.

As can be seen from the results of the tests given in Tables 1 to 4, the addition of at least one type of an antimony sulfide, selected from the group consisting of $Sb_2S_3$ and $S_2S_5$, to a lubricating-film-forming coating composition consisting of a hydrophilic resin and $MoS_2$, makes it possible to obtain a very high Falex Endurance Life, In particular, the Falex Endurance Life was especially high with further addition of $Sb_2O_3$ to the aforementioned antimony sulfides.

TABLE 1

| Practical Examples | | 1-1 | 1-2 | 1-3 | |
|---|---|---|---|---|---|
| Hydrophilic resin (dry residue) | Epoxy resin | 14.0 | 16.87 | 14.0 | *1 |
| | Melamine resin | 2.1 | 2.52 | 2.1 | *2 |
| $MoS_2$ | | 25.0 | 21.30 | 24 | *3 |
| Antimony | $Sb_2S_3$ | 8.0 | 2.8 | 8 | |

TABLE 1-continued

| Practical Examples | | 1-1 | 1-2 | 1-3 |
|---|---|---|---|---|
| sulfide | $Sb_2S_5$ | — | — | — |
| Water | | 49.7 | 42.7 | 43.3 |
| Antimony oxide | $Sb_2O_3$ | — | 2.8 | — |
| Solvent | Ethanolamine | 1.0 | 1.9 | 1.0 |
| Bentonite | | 0.3 | 0.3 | 0.3 |

TABLE 2

| Practical examples | 1-1 | 1-2 | 1-3 | |
|---|---|---|---|---|
| $MoS_2$/antimony sulfide | 1:0.32 | 1:0.13 | 1:0.33 | *4 |
| Solid lubricant/resin | 2.05 | 1.38 | 1.99 | |
| FALEX Endurance Life (min) | 340 | 460 | 340 | |

TABLE 3

| Practical Examples | | 1-4 | 1-5 | 1-6 | |
|---|---|---|---|---|---|
| Hydrophilic resin (dry residue) | Epoxy resin | 14.0 | 14.0 | 14.0 | *1 |
| | Melamine resin | 2.1 | 2.52 | 2.1 | *2 |
| $MoS_2$ | | 24 | 24 | 24 | *3 |
| Antimony sulfide | $Sb_2S_3$ | 8.0 | 8 | — | |
| | $Sb_2S_5$ | — | — | 8 | |
| Water | | 43.5 | 43.5 | 43.5 | |
| Antimony oxide | $Sb_2O_3$ | — | — | — | |
| Solvent | Ethanolamine | 1.0 | 1.0 | 1.0 | |
| Bentonite | | 0.3 | 0.3 | 0.3 | |

TABLE 4

| Practical examples | 1-4 | 1-5 | 1-6 | |
|---|---|---|---|---|
| $MoS_2$/antimony sulfide | 1:0.33 | 1:0.33 | 1:0.33 | *4 |
| Solid lubricant/resin | 1.99 | 1.99 | 1.99 | |
| FALEX Endurance Life (min) | 430 | 320 | 310 | |

In Tables 1, 2, 3, and 4:
*1: This solid component is diluted in a solvent.
  The amount of the solvent to be added is the weight of the solid component multiplied by 1.43.
2*: This solid component is diluted in a solvent.
  The amount of the solvent to be added is the weight of the solid component multiplied by 1.62.
3*: In Tables 1 through 4, all components are given in parts by weight.
4*: Weight ratio.
Type of $Sb_2S_3$ in Practical Example 1:
  1-1: $Sb_2S_3$ grade 3
  1-2: $Sb_2S_3$ grade 3
  1-3: $Sb_2S_3$ grade 3
  1-4: $Sb_2S_3$ grade 5
  1-5: $Sb_2S_3$ natural product
$MoS_2$ is $MoS_2$ MF

Practical Example 2

The FALEX Endurance Life was determined by the same method as in Practical Example 1, with the exception that in Practical examples 2-1 to 2-11 the aqueous lubricating-film-forming agents were used with different weight ratios of solid lubricating agents to resins. The results are shown in Tables 5 to 8.

TABLE 5

| Practical Examples | | 2-1 | 2-2 | 2-3 | |
|---|---|---|---|---|---|
| Resin (dry residue) | Epoxy resin | 26.7 | 22.9 | 20.0 | *1 |
| $MoS_2$ | | 24 | 24 | 24 | *3 |
| Antimony sulfide | $Sb_2S_3$ | 8 | 8 | 8 | |
| Water | | 27.6 | 33.2 | 37.5 | |
| Solvent | Ethanolamine | 2.0 | 1.8 | 1.6 | |
| Bentonite | | 0.3 | 0.3 | 0.3 | |
| $MoS_2$/Antimony sulfide | | 1:0.33 | 1:0.33 | 1:0.33 | *4 |
| Solid lubricant/resin | | 1.2 | 1.4 | 1.6 | |
| FALEX Endurance Life (min) | | 360 | 470 | 425 | |

TABLE 6

| Practical Examples | | 2-4 | 2-5 | 2-6 | |
|---|---|---|---|---|---|
| Resin (dry residue) | Epoxy resin | 17.8 | 16.0 | 12.8 | *1 |
| $MoS_2$ | | 24 | 24 | 24 | *3 |
| Antimony sulfide | $Sb_2S_3$ | 8 | 8 | 8 | |
| Water | | 40.9 | 43.6 | 48.4 | |
| Solvent | Ethanolamine | 1.4 | 1.2 | 1.0 | |
| Bentonite | | 0.3 | 0.3 | 0.3 | |
| $MoS_2$/Antimony sulfide | | 1:0.33 | 1:0.33 | 1:0.33 | *4 |
| Solid lubricant/resin | | 1.8 | 2.0 | 2.5 | |
| FALEX Endurance Life (min) | | 370 | 340 | 375 | |

In Tables 5 and 6:
  $Sb_5S_3$ is $Sb_2S_3$ grade 3
  $MoS_2$ is $MoS_2$ MF.
*1: This solid component is diluted in a solvent.
  The amount of the solvent to be added is the weight of the solid component multiplied by 1.43.
3*: In Tables S and 6, all components are given in parts by weight.
4*: Weight ratio.

TABLE 7

| Practical Examples | | 2-7 | 2-8 | 2-9 | |
|---|---|---|---|---|---|
| Resin (dry residue) | Epoxy resin | 26.7 | 22.9 | 20.0 | *1 |
| $MoS_2$ | | 24 | 24 | 24 | *3 |
| Antimony sulfide | $Sb_2S_3$ | 8 | 8 | 8 | |
| Water | | 27.6 | 33.2 | 37.7 | |
| Solvent | Ethanolamine | 2.0 | 1.8 | 1.8 | |
| Bentonite | | 0.3 | 0.3 | 0.3 | |
| $MoS_2$/Antimony sulfide | | 1:0.33 | 1:0.33 | 1:0.33 | *4 |

TABLE 7-continued

| Practical Examples | 2-7 | 2-8 | 2-9 |
|---|---|---|---|
| Solid lubricant/resin | 1.2 | 1.4 | 1.6 |
| FALEX Endurance Life (min) | 470 | 480 | 400 |

TABLE 8

| Practical Examples | 2-10 | 2-11 | |
|---|---|---|---|
| Resin (dry residue) Epoxy resin | 16.0 | 12.8 | *1 |
| $MoS_2$ | 24 | 24 | *3 |
| Antimony sulfide $Sb_2S_3$ | 8 | 8 | |
| Water | 43.2 | 48.0 | |
| Solvent Ethanol-amine | 1.6 | 1.4 | |
| Bentonite | 0.3 | 0.3 | |
| $MoS_2$/Antimony sulfide | 1:0.33 | 1:0.33 | *4 |
| Solid lubricant/resin | 2.0 | 2.5 | |
| FALEX Endurance Life (min) | 430 | 430 | |

In Tables 7 and 8:

$Sb_2S_3$ is $Sb_2S_3$ grade 5

$MoS_2$ is $MoS_2$ MF.

*1: This solid component is diluted in a solvent.

The amount of the solvent to be added is the weight of the solid component multiplied by 1.43.

3*: In Tables 7 and 8, all components are given in parts by weight.

4*: Weight ratio.

Practical Example 3

The FALEX Endurance Life was determined by the same method as in Practical Example 1, with the exception that in Practical Examples 3-1 to 3-4 the aqueous lubricating-film-forming agents were used with different weight ratios of $MoS_2$ to $S_2S_3$. The results are shown in Tables 9 and 10.

TABLE 9

| Practical Examples | 3-1 | 3-2 | |
|---|---|---|---|
| Resin (dry residue) Epoxy resin | 19.9 | 19.9 | *1 |
| Melamine resin | 3.0 | 3.0 | *2 |
| $MoS_2$ | 28.8 | 25.6 | *3 |
| Antimony sulfide $Sb_2S_3$ | 3.2 | 6.4 | |
| Water | 42.9 | 42.9 | |
| Solvent Ethanol-amine | 1.9 | 1.9 | |
| Bentonite | 0.3 | 0.3 | |
| $MoS_2$/Antimony sulfide | 1:0.11 | 1:0.25 | *4 |
| Solid lubricant/resin | 1.4 | 1.4 | |
| FALEX Endurance Life (min) | 380 | 460 | |

TABLE 10

| Practical Examples | 3-3 | 3-4 | |
|---|---|---|---|
| Resin (dry residue) Epoxy resin | 19.9 | 19.9 | *1 |
| Melamine resin | 3.0 | 3.0 | *2 |
| $MoS_2$ | 24 | 22.4 | *3 |

TABLE 10-continued

| Practical Examples | 3-3 | 3-4 | |
|---|---|---|---|
| Antimony sulfide $Sb_2S_3$ | 8.0 | 9.6 | |
| Water | 42.9 | 42.9 | |
| Solvent Ethanol-amine | 1.9 | 1.9 | |
| Bentonite | 0.3 | 0.3 | |
| $MoS_2$/Antimony sulfide | 1:0.33 | 1:0.42 | *4 |
| Solid lubricant/resin | 1.4 | 1.4 | |
| FALEX Endurance Life (min) | 480 | 470 | |

In Tables 9 and 10:

*1: This solid component is diluted in a solvent.

The amount of the solvent to be added is the weight of the solid component multiplied by 1.43.

*2: This solid component is diluted in a solvent,

The amount of the solvent to be added is the weight of the solid component multiplied by 1.62.

3*: In Tables 9 and 10, all components are given in parts by weight.

4*: Weight ratio.

$Sb_2S_3$ is $Sb_2S_3$ grade 3

$MoS_2$ is $MoS_2$ MF:.

Practical Example 4

The FALEX Endurance Life was determined by the same method as in Practical Example 1, with the exception that in Practical Examples 4-1 and 4-2 the aqueous lubricating-film-forming agents were used with a phenol resin. The results are shown in Table 11.

TABLE 11

| Practical Examples | 4-1 | 4-2 | |
|---|---|---|---|
| Resin (dry residue) Epoxy resin | 15.8 | 20.8 | *5 |
| $MoS_2$ | 22.8 | 22.8 | *3 |
| Antimony sulfide $Sb_2S_3$ | 5.7 | 5.7 | |
| Water | 18.38 | 17.47 | |
| Solvent Ethanol-amine | 1.8 | 1.8 | |
| Bentonite | 0.3 | 0.3 | |
| Solid lubricant/resin | 1.80 | 1.37 | *4 |
| $MoS_2$/Antimony sulfide | 1:0.23 | 1:0.23 | |
| FALEX Endurance Life (min) | 430 | 400 | |

In Table 11:

3*: In Table 11, all components are given in parts by weight.

4*: Weight ratio.

5*: This solid component is diluted in a solvent.

The amount of the solvent to be added is the weight of the solid component multiplied by 2.5.

$Sb_2S_3$ is $Sb_2S_3$ grade 3

$MoS_2$ is $MoS_2$ MF.

Comparative Example

The FALEX Endurance Life was determined by the same method as in Practical

Examples, with the exception that in Comparative Examples 1 through 9 the aqueous lubricating-film-forming agents were used with properties that did not satisfy the requirements specified for the aqueous lubricating-filmforming agents of the present invention. The results of the tests for Comparative Examples 1 through 6 are shown in Tables 12 through 17. As can be seen from Tables 12 through 17, comparison, e.g., between Practical Examples 1, 2 and Comparative Examples 8, 9 emphasizes the meaning of a weight ratio of solid lubricants to water-soluble resins. Furthermore, it can be seen from Comparative Example 7 that mere replacement of antimony sulfide with $Sb_2O_3$ is not sufficient for a satisfactory effect.

TABLE 12

| Comparative Examples | | 1 | 2 | 3 | |
|---|---|---|---|---|---|
| Resin (dry residue) | Epoxy resin | 14.0 | 14.0 | 14.0 | *1 |
| | Melamine resin | 2.1 | 2.1 | 2.1 | *2 |
| $MoS_2$ | | 15 | 5.0 | 24.0 | *3 |
| MoDTP | | — | — | — | |
| ZnS | | 5.0 | — | 2.7 | |
| $Ca_3(PO_4)_2$ | | 5.0 | — | — | |
| PTFE-2 | | 1.88 | — | 0.6 | |
| PTFE-1 | | — | 15.0 | — | |
| (1) | | — | — | 0.1 | |

TABLE 13

| Comparative Examples | 1 | 2 | 3 | |
|---|---|---|---|---|
| $Sb_2O_3$ | — | — | — | *3 |
| BN | — | — | — | |
| Water | 55.72 | 62.6 | 55.2 | |
| Solvent | 1.0 | 1.0 | 1.0 | |
| Bentonite | 0.3 | 0.3 | 0.3 | |
| Solid lubricant/resin | 1.67 | 1.24 | 1.70 | *4 |
| FALEX Endurance Life (min) | 118 | 10 | 65 | |

TABLE 14

| Comparative Examples | | 4 | 5 | 6 | |
|---|---|---|---|---|---|
| Resin (dry residue) | Epoxy resin | 14.0 | 14.0 | 14.0 | *1 |
| | Melamine resin | 2.1 | 2.1 | 2.1 | *2 |
| $MoS_2$ | | 9.5 | 9.5 | 24.0 | *3 |
| MoDTP | | — | 1.0 | — | |
| ZnS | | 2.5 | 2.5 | — | |
| $Ca_3(PO_4)_2$ | | — | — | — | |
| PTFE-2 | | — | — | — | |
| PTFE-1 | | — | — | — | |
| (1) | | — | — | — | |

TABLE 15

| Comparative Examples | 4 | 5 | 6 | |
|---|---|---|---|---|
| $Sb_2O_3$ | 12.5 | 12.5 | — | *3 |
| BN | — | — | 10.0 | |
| Water | 58.1 | 57.1 | 48.6 | |
| Solvent | 1.0 | 1.0 | 1.0 | |
| Bentonite | 0.3 | 0.3 | 0.3 | |
| Solid lubricant/resin | 1.52 | 1.58 | 2.11 | *4 |
| FALEX Endurance Life (min) | 186 | 163 | 36 | |

TABLE 16

| Comparative Examples | | 7 | 8 | |
|---|---|---|---|---|
| Resin (dry residue) | Epoxy resin | 14.0 | 26.58 | *1 |
| | Melamine resin | 2.1 | 4.51 | *2 |
| $MoS_2$ | | 24 | 12.35 | *3 |
| Antimony sulfide | $Sb_2S_3$ | — | 1.62 | |
| | $Sb_2S_5$ | — | — | |
| Water | | 43.5 | 36.7 | |
| Antimony oxide | $Sb_2O_3$ | 8.0 | 1.62 | |
| Solvent | Ethanol-amine | 1.0 | 3.0 | |
| Bentonite (see note above!!!) | | 0.3 | 0.3 | |

TABLE 17

| Comparative Examples | 7 | 8 | |
|---|---|---|---|
| $MoS_2$/Antimony sulfide | — | 1:0.13 | *4 |
| Solid lubricant/resin | 1.99 | 0.5 | |
| FALEX Endurance Life (min) | 200 | 140 | |

In Tables 12 to 17:
*1: This solid component is diluted in a solvent.
The amount of the solvent to be added is the weight of the solid component multiplied by 1.43.
*2: This solid component is diluted in a solvent.
The amount of the solvent to be added is the weight of the solid component multiplied by 1.62.
3*: All components are given in parts by weight.
4*: Weight ratio.
$MoS_2$ is $MoS_2$ MF.
(1): Zinc 2-mercaptol imidazole
The starting materials which have been used in aforementioned Practical and Comparative Examples are described in more detail below:
Epoxy resin (epoxy resin ester modified with linseed-oil and tung-oil):
(RESYDROL WE 237L) "Resydrol" is a registered trademark of Vianova-Kunstharz Aktiengesellschaft of Vienna.
Melamine resin (non-plasticized melamine resin) (RESYDROL WM 501)
$MoS_2$ MF: [$MoS_2$, Microfine], CLIMAX CO.
$MoS_2$ SF: [$MoS_2$, Superfine], CLIMAX Co.
$Sb_2S_3$ grade 3: Product of synthesis of GESCHAFTSBEREICH-CHEMI Co., DBPC GRADE 3
$Sb_2S_3$ grade 5: Product of synthesis GESCHAFTSBEREICH-CHEMI Co., DBPC GRADE 5
$Sb_2S_3$ N: natural product
$Sb_2S_5$: product of GESCHAFTSBEREICH-CHEMI Co
$Sb_2O_3$: product of LIEBAU CHEMIE HANDELSGE-SELSCHAFT GMBH.
[ANTIMONTRIOXIDE LCH/RS]
MoDTP: Molybdenum dithiophosphate
PTEF-1: Polytetrafluoroethylene powder
PTEF-2: Polytetrafluoroethylene dispersion
The invention is efficient in that it provides a coating agent which greatly reduces dissipation of organic solvents into environment and at the same time is capable of forming long-lasting lubricating films with perfect load-carrying capacity for use on sliding parts.

What we claim is:

1. An aqueous coating agent comprising a hydrophilic resin, a solid lubricating agent comprising $MoS_2$, $Sb_2S_3$ and $Sb_2S_5$, and water, wherein the weight ratio of $MoS_2:(Sb_2S_3+Sb_2S_5)$ is from 1:0.05 to 1:1.2, and the weight ratio of the solid lubricating agent:hydrophilic resin is from 0.7:1 to 3:1.

2. An aqueous coating agent comprising a hydrophilic resin which is an epoxy ester resin obtained by esterifying an epoxy resin with an oil selected from the group consisting of linseed, dehydrated castor, soybean and coconut, a solid lubricating agent comprising $MoS_2$, at least one antimony sulfide selected from the group consisting of $Sb_2S_3$ and $Sb_2S_5$, and water, wherein the weight ratio of $MoS_2$:antimony sulfide is from 1:0.05 to 1:1.2, and the weight ratio of the solid lubricating agent:hydrophilic resin is from 0.7:1 to 3:1.

3. The aqueous coating agent of claim 1 or 2 wherein the weight ratio of $MoS_2$ to antimony sulfide is from 1:0.2 to 1:0.5.

4. The aqueous coating agent of claim 1 or 2 wherein said solid lubricating agent further comprises antimony oxide.

5. The aqueous coating agent of claim 4 wherein the weight ratio of antimony oxide to antimony sulfide is from 1:0.5 to 1:5.0.

6. The aqueous coating agent of claim 5 wherein the weight ratio of antimony sulfide is from 1:0.5 to 1:1.5.

7. The aqueous coating agent of claim 1 wherein said hydrophilic resin is an epoxy ester obtained by esterifying an epoxy resin with an oil selected from the group consisting of linseed, dehydrated castor, soybean, and coconut.

8. The aqueous coating agent of claim 4 wherein said hydrophilic resin is an epoxy ester obtained by esterifying an epoxy resin with an aliphatic resin.

9. The aqueous coating agent of claim 1 or 2 further comprising a compatibility agent that improves compatibility between water and the hydrophilic resin.

10. The aqueous coating agent of claim 4 further comprising a compatibility agent that improves compatibility between water and the hydrophilic resin.

11. The aqueous coating agent of claim 9 wherein the compatibility agent is selected from the group consisting of water soluble amines, NaOH and ethanolamine.

12. The aqueous coating agent of claim 11 wherein the compatibility agent is ethanolamine.

13. The aqueous coating agent of claim 1 or 2 wherein the weight ratio of the solid lubricating agent to the hydrophilic resin is from 0.9:1 to 2.5:1.

* * * * *